(12) United States Patent
Wade et al.

(10) Patent No.: US 8,159,764 B2
(45) Date of Patent: Apr. 17, 2012

(54) LENS DRIVE DEVICE

(75) Inventors: Tatsuki Wade, Nagano (JP); Akihito Wada, Nagano (JP)

(73) Assignee: Nidec Sankyo Corporation (JP)

( * ) Notice: Subject to any disclaimer, the term of this patent is extended or adjusted under 35 U.S.C. 154(b) by 265 days.

(21) Appl. No.: 12/692,717

(22) Filed: Jan. 25, 2010

(65) Prior Publication Data

US 2010/0188761 A1   Jul. 29, 2010

(30) Foreign Application Priority Data

Jan. 23, 2009   (JP) ................... 2009-012481

(51) Int. Cl.
*G02B 7/02* (2006.01)
*G02B 15/14* (2006.01)

(52) U.S. Cl. ......... 359/824; 359/814; 359/694; 359/696

(58) Field of Classification Search .......... 359/694–704, 359/811–824

See application file for complete search history.

(56) References Cited

U.S. PATENT DOCUMENTS

| 8,040,624 B1 * | 10/2011 | Miyazaki et al. ............. 359/824 |
| 2010/0271717 A1 * | 10/2010 | Sue et al. ..................... 359/824 |

FOREIGN PATENT DOCUMENTS

JP   2008-58659 A   3/2008

* cited by examiner

*Primary Examiner* — Mohammed Hasan
(74) *Attorney, Agent, or Firm* — Cantor Colburn LLP

(57) ABSTRACT

A lens drive device may include a movable body holding a lens, a fixed body movably holding the movable body, and a drive mechanism for driving the movable body in the optical axis direction. The drive mechanism may include a drive magnet part formed in a substantially triangular prism shape and disposed at least in one of four corners of the lens drive device, a drive coil wound around in a substantially triangular tube shape and attached to the movable body, and a coil protection member attached to at least one of an object side and an opposite-to-object side of the drive coil. The coil protection member may include a first coil protection end part and a second coil protection end part which are superposed on an outer side end of the drive coil or protruded toward an outer side from the outer side end of the drive coil to prevent the drive coil from contacting with the fixed body such as a case body.

18 Claims, 10 Drawing Sheets

LENS DRIVE DEVICE

CROSS REFERENCE TO RELATED APPLICATION

The present invention claims priority under 35 U.S.C. §119 to Japanese Application No. 2009-12481 filed Jan. 23, 2009, the entire contents of which are incorporated herein by reference.

FIELD OF THE INVENTION

An embodiment of the present invention may relate to a lens drive device which is mounted on a relatively small camera or imager used in a cellular phone or the like.

BACKGROUND OF THE INVENTION

A lens drive device for driving a photographing lens for a camera or imager mounted on a cellular phone or the like has been conventionally known, which includes a movable lens body, which holds a plurality of lenses and which is moved in an optical axis direction, and a fixed body which holds the movable lens body movably through two flat springs (see, for example, Japanese Patent Laid-Open No. 2008-58659). In this lens drive device, a drive coil is wound around an outer peripheral face of a cylindrical sleeve which structures the movable lens body. Further, in this lens drive device, four magnets are disposed so as to face an outer peripheral face of the drive coil.

In recent years, in the market of a camera or imager used in a cellular phone or the like, demand for downsizing of a camera or imager has been remarkably increased. Therefore, demand for downsizing of a lens drive device which is mounted on a camera or imager has been also remarkably increased. On the other hand, in recent years, in the market of a camera or imager used in a cellular phone or the like, demand for high pixel density and high resolution has become higher and thus a diameter of a lens which is mounted on the lens drive device is liable to be larger. Therefore, it is difficult to make the lens drive device smaller.

SUMMARY OF THE INVENTION

In view of the problem described above, at least an embodiment of the present invention may advantageously provide a lens drive device whose shape when viewed in the optical axis direction of a lens is substantially rectangular and whose size is capable of being reduced even when a diameter of a mounted lens becomes larger.

According to at least an embodiment of the first present invention, there may be provided a lens drive device whose shape is substantially rectangular when viewed in an optical axis direction of a lens including a movable body which holds the lens and which is movable in the optical axis direction, a fixed body which movably holds the movable body, and a drive mechanism for driving the movable body in the optical axis direction. The drive mechanism includes a drive magnet part which is formed in a substantially triangular prism shape and disposed at least one of four corners of the lens drive device, a drive coil which is wound around in a substantially triangular tube shape and which is attached to the movable body so that its inner peripheral face is oppositely disposed to an outer peripheral face of the drive magnet part through a gap space, and a coil protection member which is attached to at least one of an object to be photographed or imaged side and an opposite-to-object side of the drive coil. The drive magnet part is magnetized so that a magnetic flux passing through the drive coil is generated at an opposite position to the drive coil. In addition, in a case that two directions which are perpendicular to each other and which are substantially parallel to side faces of the lens drive device are set to be a first direction and a second direction, the coil protection member includes, when viewed in the optical axis direction, a first coil protection end part which is superposed on an outer side end of the drive coil in the first direction or which is protruded toward an outer side in the first direction from the outer side end of the drive coil in the first direction, and a second coil protection end part which is superposed on an outer side end of the drive coil in the second direction or which is protruded toward an outer side in the second direction from the outer side end of the drive coil in the second direction.

In the lens drive device in accordance with an embodiment of the present invention, a drive magnet part formed in a substantially triangular prism shape is disposed at least one of four corners of the lens drive device whose shape viewed in the optical axis direction of a lens is substantially quadrangular. Further, a drive coil which is wound around in a substantially triangular tube shape is disposed so that its inner peripheral side faces an outer peripheral face of the drive magnet part through a predetermined gap space. Therefore, the drive magnet part and the drive coil can be disposed at the four corners of the lens drive device which are likely to be a dead space.

Further, in the embodiment of the present invention, an inner peripheral face of the drive coil which is wound around in a substantially triangular tube shape is oppositely disposed to an outer peripheral face of the drive magnet part through a predetermined gap space, and the drive magnet part is magnetized so that the magnetic flux passing through the drive coil is generated at an opposite position to the drive coil. Therefore, a magnetic circuit for driving the movable body is efficiently formed by utilizing the entire periphery of the drive magnet part and the entire periphery of the drive coil. Accordingly, even when the sizes of the drive magnet part and the drive coil are reduced, a sufficient drive force for driving the movable body are obtained. In other words, while securing a drive force for driving the movable body, the sizes of the drive magnet part and the drive coil can be reduced.

As described above, in the embodiment of the present invention, the sizes of the drive magnet part and the drive coil are capable of being reduced and the drive magnet part and the drive coil can be disposed at four corners of the lens drive device which are likely to be a dead space. Accordingly, in the embodiment of the present invention, even when a diameter of a mounted lens becomes larger, the lens drive device can be made smaller.

Further, in the embodiment of the present invention, the coil protection member includes, when viewed in the optical axis direction, a first coil protection end part which is superposed on an outer side end of the drive coil in the first direction or which is protruded toward an outer side in the first direction from the outer side end of the drive coil in the first direction, and a second coil protection end part which is superposed on an outer side end of the drive coil in the second direction or which is protruded toward an outer side in the second direction from the outer side end of the drive coil in the second direction. Therefore, for example, due to an impact which is applied to the lens drive device, when the movable body is relatively displaced in the first direction or the second direction with respect to the fixed body, when the movable body is relatively turned around the optical axis direction with respect to the fixed body, when the optical axis of the movable body is inclined, or the like, the coil protection member is abutted with other structural components such as a case body to protect the drive coil. Accordingly, in the embodiment of the present invention, disconnection of the drive coil is prevented.

In accordance with an embodiment of the present invention, the drive coil is wound around so as to form a substantially rectangular equilateral triangle which is provided with two perpendicular face parts perpendicular to each other and a slant face part connecting the two perpendicular face parts, and the drive coil is attached to the movable body so that the perpendicular face parts are substantially parallel to the side faces of the lens drive device, and the two perpendicular face parts are prevented from contacting with the inner peripheral face of the case body by the first coil protection end part and the second coil protection end part. Specifically, the first coil protection end part and the second coil protection end part are preferably protruded toward outer peripheral sides from outer peripheral faces of the two perpendicular face parts when viewed in the optical axis direction. In this case, it is preferable that the coil protection member is formed with inner peripheral side coil protection end parts which are protruded, toward inner peripheral sides from inner peripheral faces of the two perpendicular face parts when viewed in the optical axis direction. According to this structure, even when an impact is applied to the lens drive device, the drive magnet part and the drive coil are prevented from being contacted with each other.

In accordance with an embodiment of the present invention, the coil protection member is attached to an end face on the object to be photographed or imaged side and/or an end face on the opposite-to-object side of the drive coil. According to this structure, the coil protection member is mounted by utilizing the end face on the object to be photographed or imaged side and the end face on the opposite-to-object side of the drive coil and thus another structural member for mounting the coil protection member is not required separately. Accordingly, the lens drive device can be made smaller. In this case, it may be structured that the movable body includes a lens holder which is provided with a small diameter part on which a small diameter lens is mounted and a large diameter part on which a large diameter lens is mounted, and a sleeve which holds the lens holder on its inner peripheral side and which is formed with a placing face on which the drive coil is placed at a boundary portion between the small diameter part and the large diameter part of the lens holder, and the drive coil is fixed to an outer peripheral face of the sleeve which corresponds to the small diameter part of the lens holder. According to this structure, the lens drive device can be further made smaller.

In accordance with an embodiment of the present invention, the lens drive device further includes a case body which is formed of magnetic material in a substantially rectangular tube shape and which is disposed so as to surround the movable body and the drive mechanism. According to this structure, leakage of magnetic flux which is generated from the drive magnet part is prevented and an effective magnetic circuit is formed. Further, in the embodiment of the present invention, even when a case body is disposed so as to surround the drive mechanism, contact of the drive coil with the case is prevented by the coil protection member.

In accordance with an embodiment of the present invention, the coil protection member is attached to an end face on the object to be photographed or imaged side and an end face on the opposite-to-object side of the drive coil. According to this structure, even when a protruding amount of the coil protection member from the drive coil toward the outer side in the first direction or in the second direction is small, contact of the drive coil with other structural components when the optical axis of the movable body is inclined is prevented surely.

In accordance with an embodiment of the present invention, the drive magnet part is disposed at four corners of the lens drive device, and the coil protection member is formed in a substantially rectangular frame shape. According to this structure, even when the drive coil is disposed at four corners of the lens drive device so as to correspond to the drive magnet parts disposed at four corners of the lens drive device, the four drive coils are protected by one piece of the coil protection member. Therefore, the structure of the lens drive device and assembling processes for the lens drive device can be simplified.

In accordance with an embodiment of the present invention, the coil protection member covers end faces on the object to be photographed or imaged side and/or end faces on the opposite-to-object side of the perpendicular face parts and the slant face part. According to this structure, even when the movable body is relatively displaced with respect to the fixed body in the optical axis direction excessively due to an impact applied to the lens drive device, the drive coil is protected surely by the coil protection member. Further, in this case, it is preferable that the coil protection member is provided with a frame part which is formed in a substantially rectangular frame shape, and slant side parts which are formed at four corners of the frame part so as to cover the slant face parts. According to this structure, even when the movable body is relatively displaced with respect to the fixed body in the optical axis direction excessively, the drive coil is protected surely by one piece of the coil protection member. Therefore, the structure of the lens drive device and assembling processes for the lens drive device can be simplified.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Embodiments of the present invention will be described below with reference to the accompanying drawings.

Figure 1:
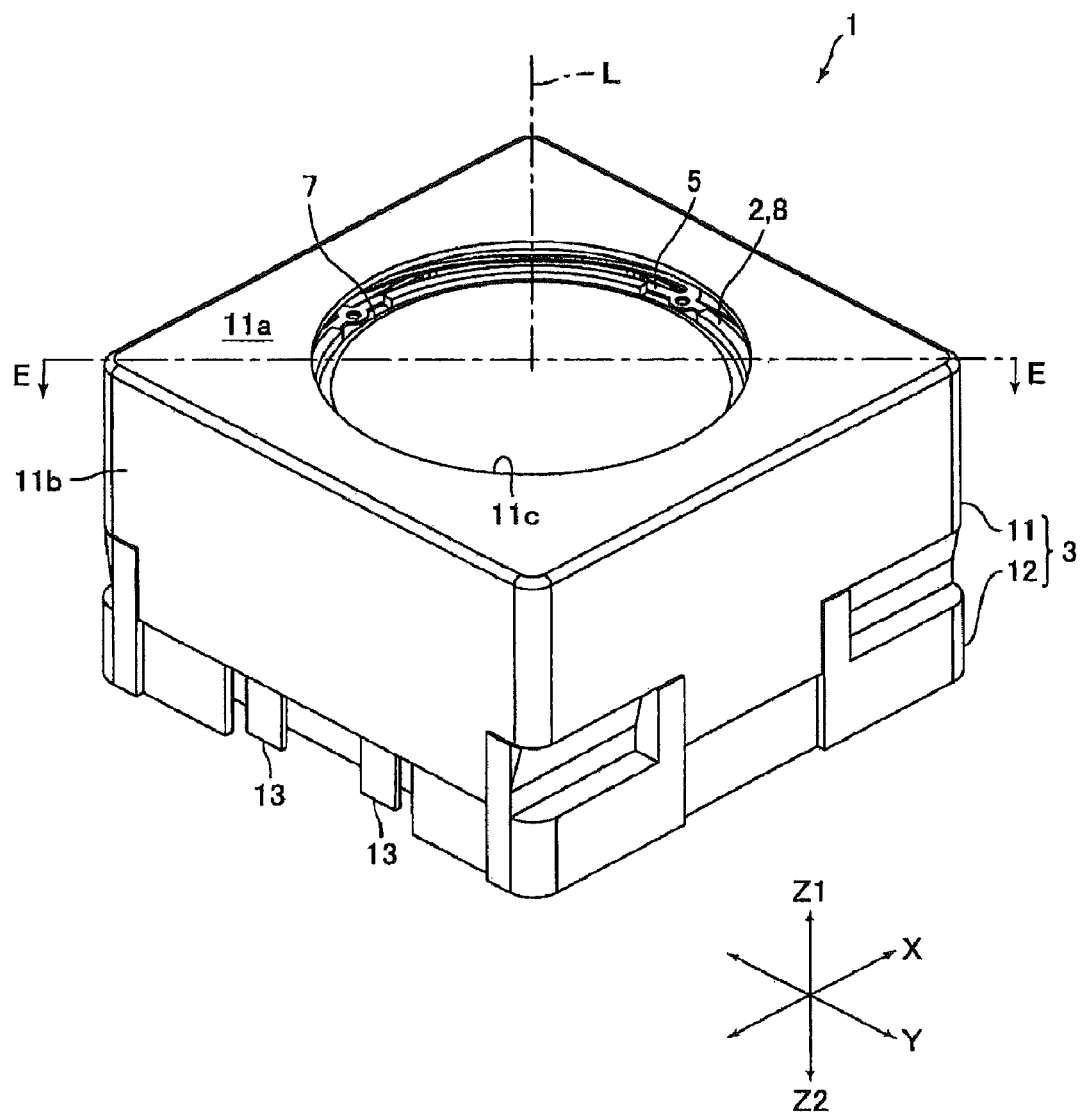
FIG. 1 is a perspective view showing a lens drive device in accordance with an embodiment of the present invention.
Figure 2:
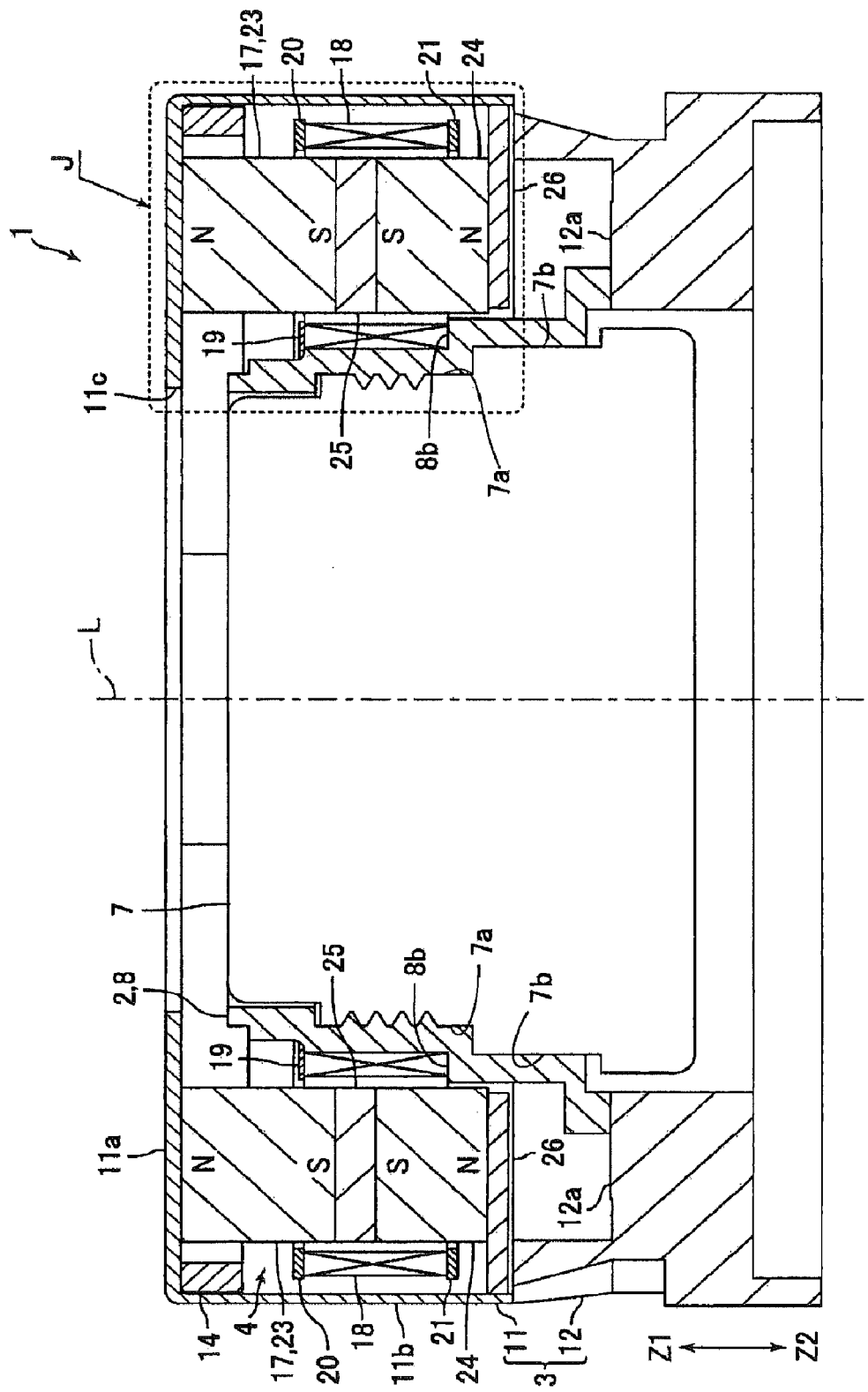
FIG. 2 is a cross-sectional view showing the lens drive device which is cut by the line "E-E" in FIG. 1.
Figure 3:
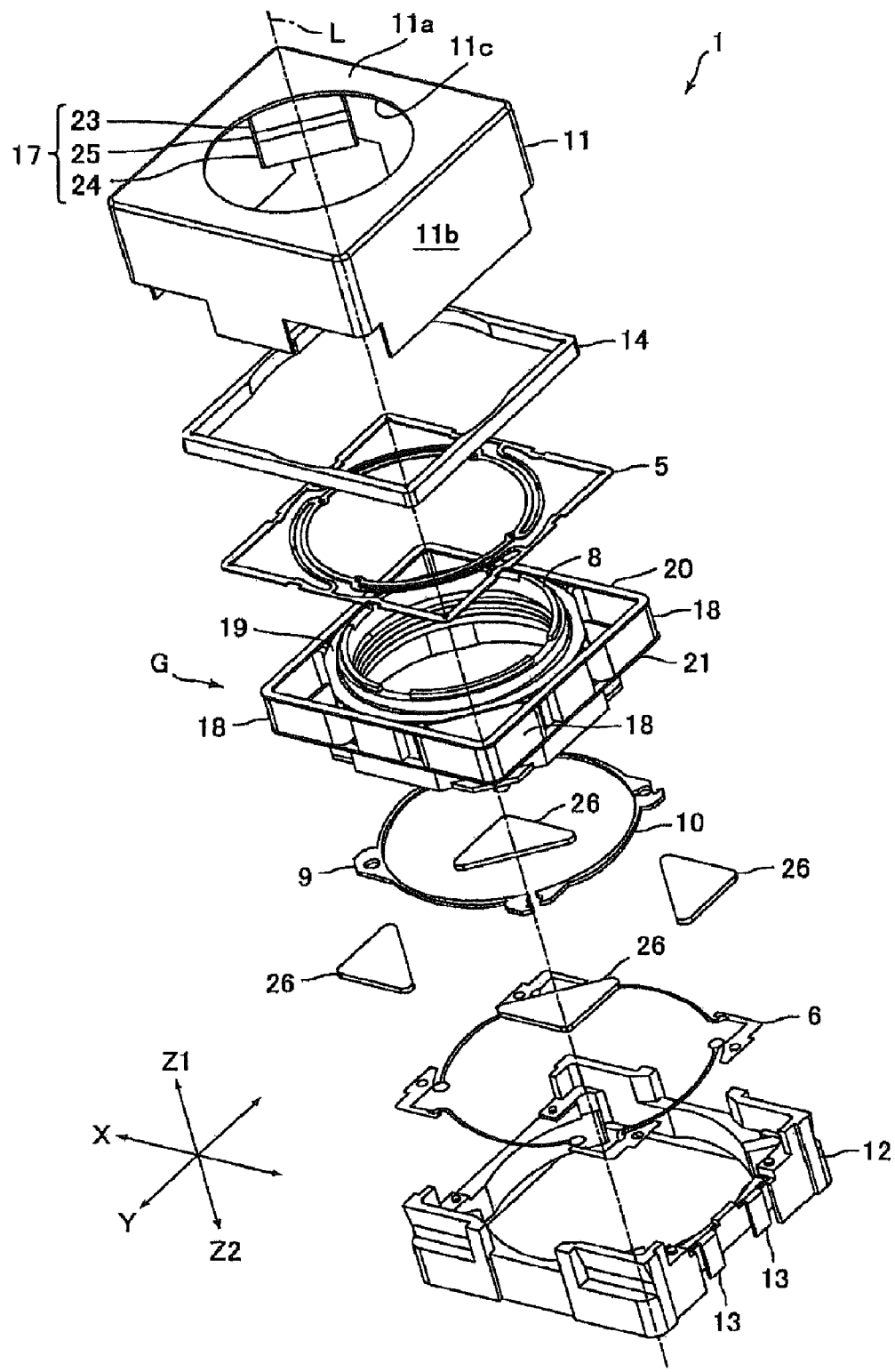
FIG. 3 is an exploded perspective view showing the lens drive device shown in FIG. 1.
Figure 4:
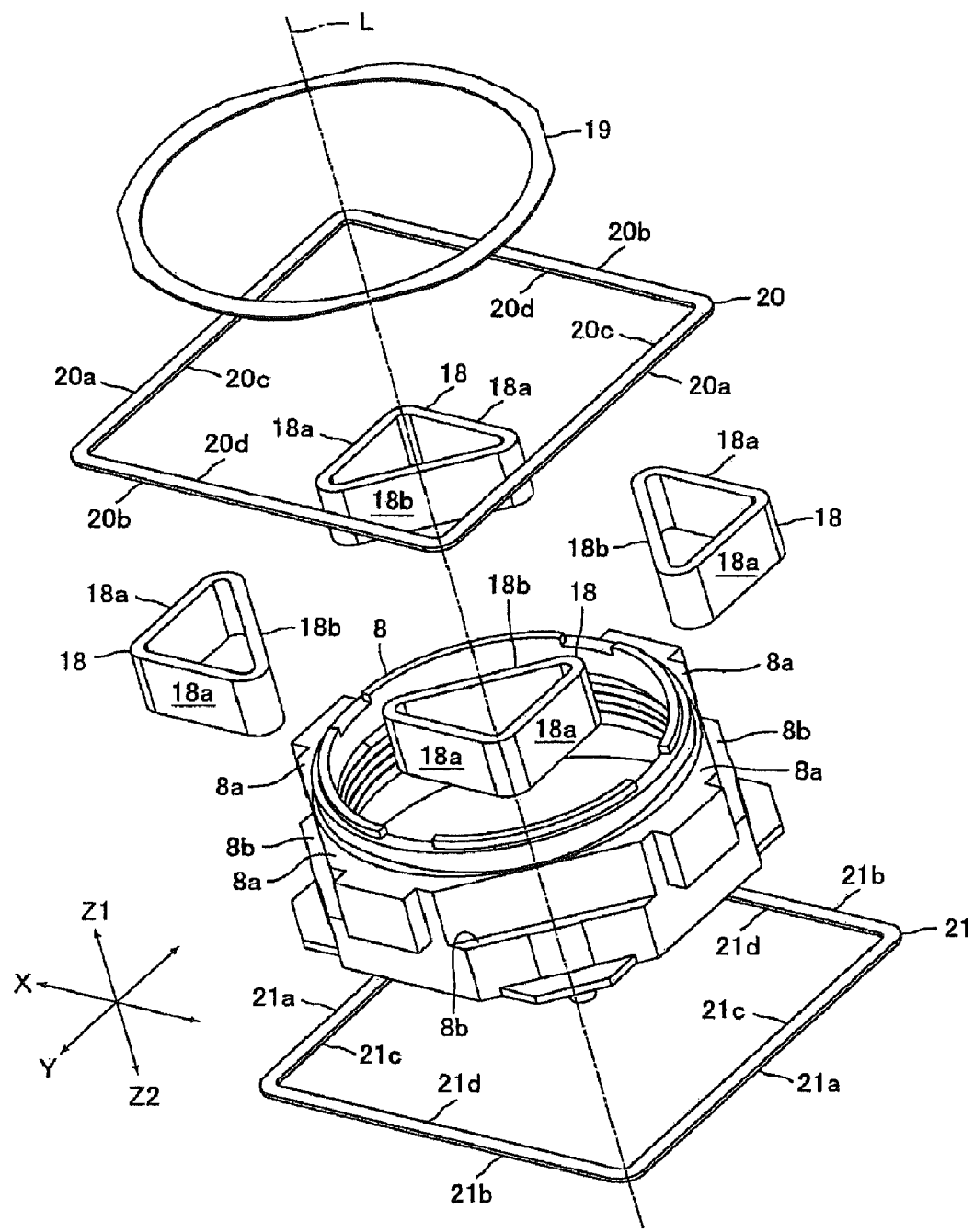
FIG. 4 is an exploded perspective view showing the "G" part in FIG. 3.
Figure 5:
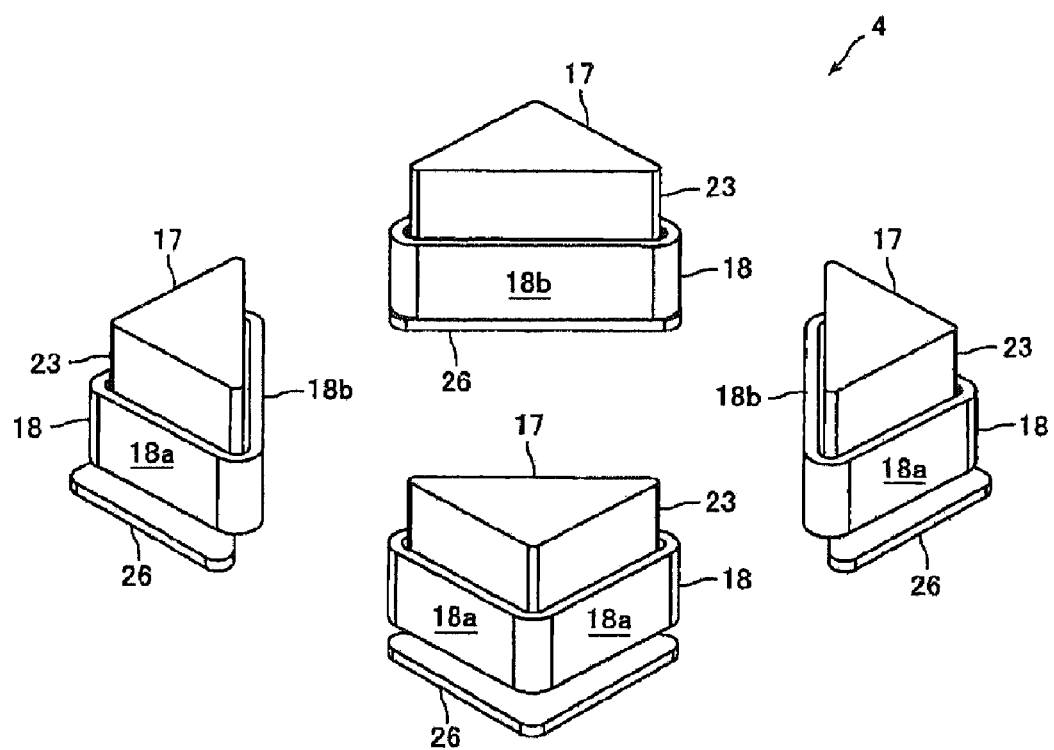
FIG. 5 is a perspective view showing an arranging relationship of drive magnet parts and drive coils shown in FIG. 2.

FIG. 1 is a perspective view showing a lens drive device 1 in accordance with an embodiment of the present invention. FIG. 2 is a cross-sectional view showing the lens drive device 1 which is cut by the line "E-E" in FIG. 1. FIG. 3 is an exploded perspective view showing the lens drive device 1 shown in FIG. 1, FIG. 4 is an exploded perspective view showing the "G" part in FIG. 3. FIG. 5 is a perspective view showing an arranging relationship of drive magnet parts 17 and drive coils 18 shown in FIG. 2.

A lens drive device 1 in this embodiment is mounted on a relatively small camera or imager which is used in a cellular phone or the like. As shown in FIG. 1, an outer shape of the lens drive device 1 is formed in a substantially rectangular prism shape. In other words, the lens drive device 1 is formed so that a shape viewed in a direction of an optical axis "L" of a photographing lens (optical axis direction) is substantially quadrangular. In this embodiment, the lens drive device 1 is formed so that a shape viewed in the optical axis direction is substantially square.

In a camera or imager on which the lens drive device 1 in this embodiment is mounted, an imaging element (not shown) is disposed on a lower side ("Z2" direction side) in FIG. 2, and an object to be photographed or imaged disposed on an upper side in FIG. 2 ("Z1" direction side) is photographed or imaged. Therefore, in the following description, the "Z1" direction side is the object to be photographed or imaged side and the "Z2" direction side is the opposite-to-object side (imaging element side). Further, in the following descriptions, two directions perpendicular to the optical axis "L" and perpendicular to each other are set to be the "X" direction and the "Y" direction. Further, a plane which is formed of the "X" direction and the "Y" direction is referred to as an "X-Y" plane. In this embodiment, four side faces of the lens drive device 1 are parallel to the "X" direction or the "Y" direction. Further, the "X" direction in this embodiment is a first direction and the "Y" direction is a second direction.

The lens drive device 1 includes, as shown in FIGS. 1 and 2, a movable body 2 which holds a photographing lens and which is movable in the optical axis direction, a fixed body 3 which movably holds the movable body 2 in the optical axis direction, and a drive mechanism 4 for driving the movable body 2 in the optical axis direction. The movable body 2 is movably held by the fixed body 3 through two kinds of flat springs 5 and 6 (see FIG. 3). The flat springs 5 and 6 are not shown in FIG. 2.

The movable body 2 includes a sleeve 8, which holds a lens holder 7 to which a plurality of lenses are fixed, and coil end fixing members 9 and 10 to which end parts of the drive coils 18 structuring the drive mechanism 4 are electrically connected and fixed by soldering or the like. The coil end fixing members 9 and 10 are not shown in FIG. 2 and the lens holder 7 is not shown in FIG. 3.

The lens holder 7 is formed in a substantially cylindrical shape and a plurality of lenses whose shape viewed in the optical axis direction is substantially circular are fixed on its inner peripheral side. In this embodiment, a small diameter lens whose diameter is smaller is disposed on a small diameter part 7a on an object side of the lens holder 7 and a large diameter lens whose diameter is larger than the small diameter lens is disposed on a large diameter part 7b on an opposite-to-object side. Therefore, as shown in FIG. 2, an outer diameter of the small diameter part 7a on the object side of the lens holder 7 is smaller than an outer diameter of the large diameter part 7b on the opposite-to-object side. Further, a male screw is formed on the outer peripheral face of the small diameter part 7a on the object side of the lens holder 7.

The sleeve 8 is formed in a tube shape and the lens holder 7 is held on its inner peripheral side. In other words, a female screw which engages with the male screw formed on the outer peripheral face of the small diameter part 7a of the lens holder 7 is formed on the inner peripheral face of the sleeve 8. Further, in this embodiment, an outer diameter of the small diameter part 7a on the object side of the lens holder 7 is set to be smaller than its outer diameter on the opposite-to-object side and thus an outer diameter on the object side of the sleeve 8 is set to be smaller than its outer diameter on the opposite-to-object side.

As shown in FIG. 4, an outer peripheral face of the sleeve 8 corresponding to the small diameter part 7a of the lens holder 7 is formed with a first placing face 8a on which a magnetic member 19 structuring the drive mechanism 4 is placed and a second placing face 8b on which a drive coil 18 structuring the drive mechanism 4 is placed. The first placing face 8a and the second placing face 8b are formed flatly so as to be parallel to the "X-Y" plane and are formed at four positions with a substantially 90° pitch around the optical axis "L". Further, the first placing face 8a and the second placing face 8b are formed so as to be displaced from each other by a substantially 45° around the optical axis "L". The second placing face 8b on which the drive coil 18 is placed is formed at a boundary portion between the small diameter part 7a and the large diameter part 7b of the lens holder 7, and the drive coil 18 is fixed to the outer peripheral face of the sleeve 8 which corresponds to the small diameter part 7a of the lens holder 7.

The coil end fixing member 9 and 10 are formed of metal material having electroconductivity. In this embodiment, the coil end fixing member 9 is formed in a three-quarter circular arc shape and the coil end fixing member 10 is formed in a one-quarter circular arc shape. The coil end fixing members 9 and 10 are fixed to an end face on the opposite-to-object side of the sleeve 8.

The fixed body 3 includes a first case body 11 which is disposed on the object to be photographed or imaged side and a second case body 12 which is disposed on the opposite-to-object side.

The first case body 11 is formed of magnetic material and is formed in a substantially rectangular tube shape which is provided with a bottom part 11a and a tube part 11b. A center of the bottom part 11a disposed on the object to be photographed or imaged side is formed with a circular through hole 11c. The first case body 11 is disposed to surround the outer peripheral side of the movable body 2 and the drive mechanism 4.

The second case body 12 is formed, for example, of resin material and is formed in a substantially rectangular tube shape. The second case body 12 is, as shown in FIG. 2, formed with an abutting face 12a, with which an end face on the opposite-to-object side of the sleeve 8 is abutted, so as to be parallel to the "X-Y" plane. Further, the second case body 12 is, as shown in FIG. 3, fixed with terminals 13. The second case body 12 is attached to the opposite-to-object side of the first case body 11 so as to cover the outer peripheral side on the opposite-to-object side of the lens holder 7.

The flat spring 5 is structured of a sleeve fixed part which is fixed to the sleeve 8, a case body fixed part which is fixed to the first case body 11, and spring parts which connect the sleeve fixed part with the case body fixed part. The flat spring 5 is disposed on the object side of the movable body 2. The sleeve fixed part is fixed to an end face on the object side of the sleeve 8. The case body fixed part is fixed to an opposite-to-object side face of the bottom part 11a of the first case body 11 through a spacer 14 formed in a substantially rectangular frame shape. In other words, the case body fixed part is fixed to the spacer 14 which is fixed to an opposite-to-object side face of the bottom part 11a.

The flat spring 6 is structured of a sleeve fixed part which is fixed to the sleeve 8, a case body fixed part which is fixed to the second case body 12, and spring parts which connect the sleeve fixed part with the case body fixed part. The flat spring 6 is disposed on the opposite-to-object side of the movable body 2. The sleeve fixed part is fixed to an end face on the opposite-to-object side of the sleeve 8 through the coil end fixing members 9 and 10. In other words, the sleeve fixed part is fixed to the coil end fixing, members 9 and 10. The case body fixed part is fixed to a fixing face which is formed on the object side of the second case body 12.

The drive mechanism 4 includes, as shown in FIGS. 2 through 5, four drive magnet parts 17 which are formed in a substantially triangular prism shape and are disposed at four corners of the lens drive device 1, specifically, at four inner corners of the first case body 11, four drive coils 18 which are wound around in a substantially triangular tube shape and whose inner peripheral faces are oppositely disposed to outer peripheral faces of the drive magnet parts 17 through predetermined gap spaces, and a magnetic member 19 which is disposed on the object side with respect to the drive coils 18, and coil protection members 20 and 21 which are attached to the object sides and the opposite-to-object sides of the drive coils 18. A detailed structure of the drive mechanism 4 will be described below.

Figure 6:
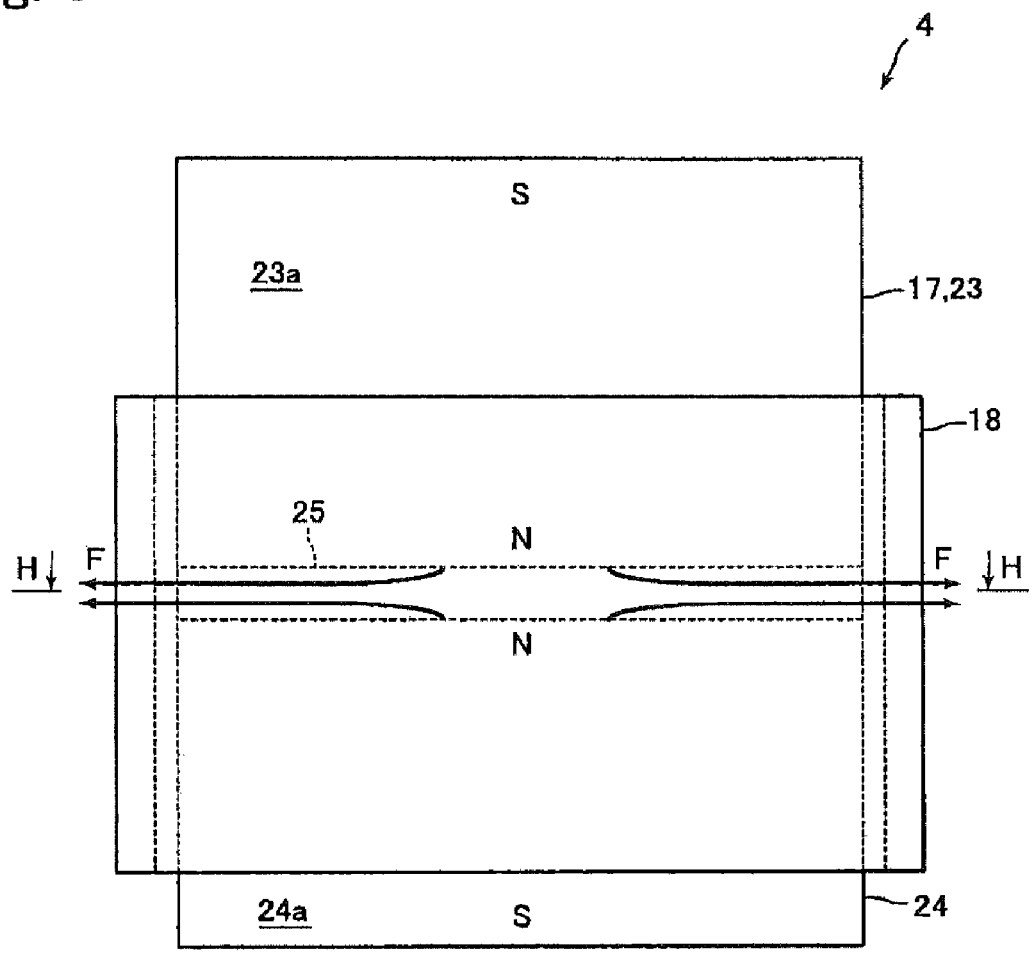
FIG. 6 is a side view showing the drive magnet part and the drive coil shown in FIG. 5.
Figure 7:
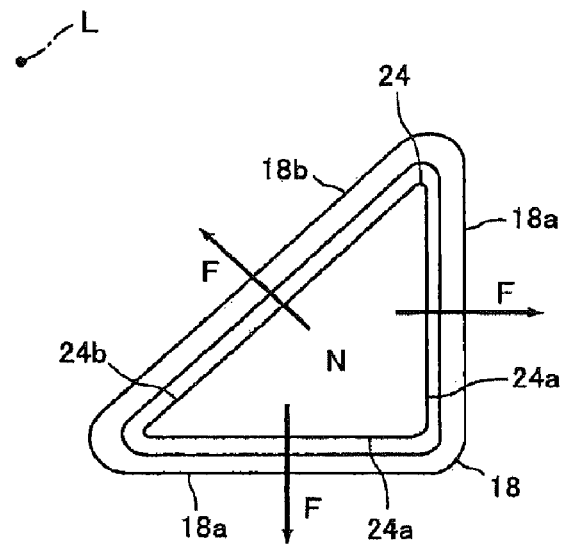
FIG. 7 is a plan view showing a drive magnet piece and the drive coil which is viewed in the "H-H" direction in FIG. 6.
Figure 8:
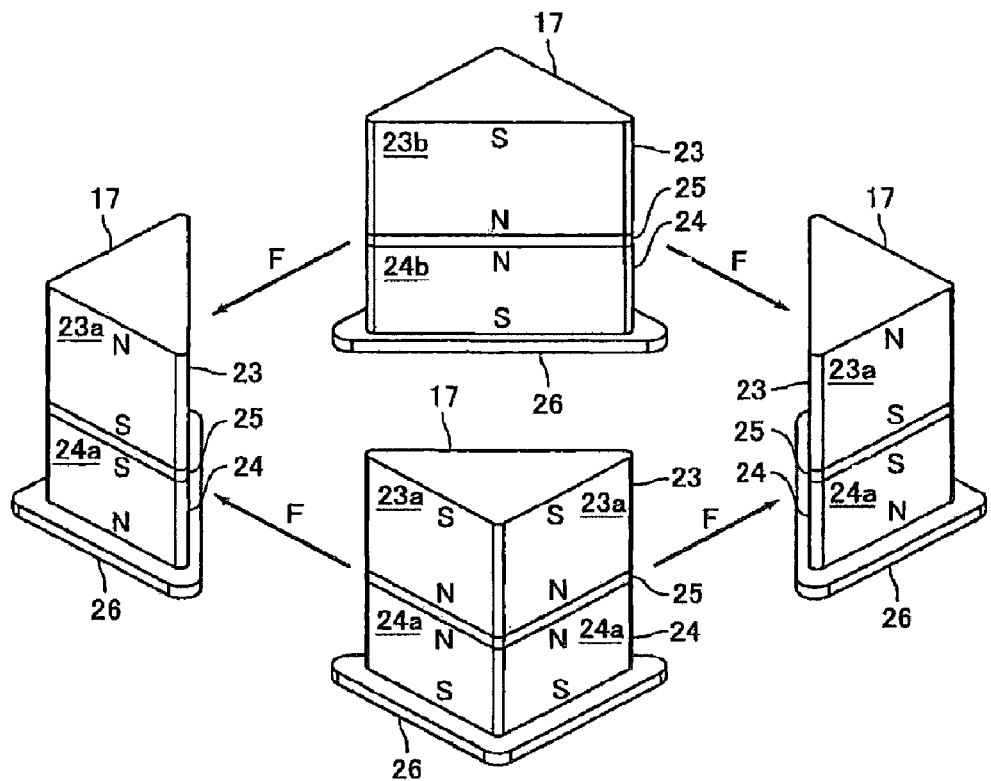
FIG. 8 is an explanatory perspective view showing magnetized states of the drive magnet parts which are disposed at four corners of the lens drive device shown in FIG. 1.
Figure 9:
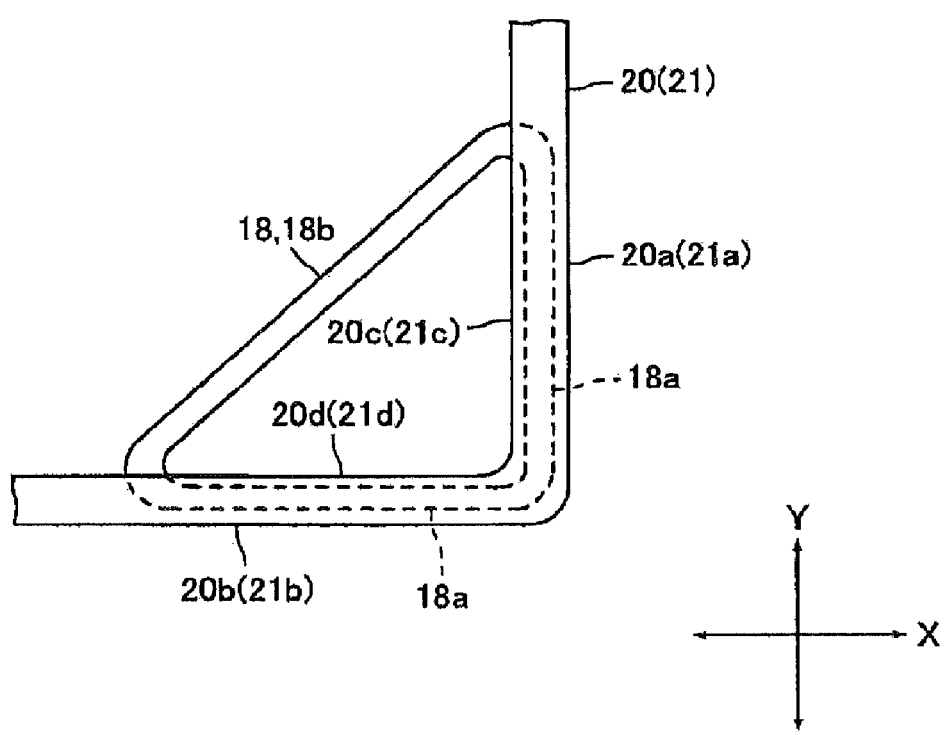
FIG. 9 is an explanatory plan view showing an arranging relationship between the drive coil and a coil protection member shown in FIG. 4.

FIG. 6 is a side view showing the drive magnet part 17 and the drive coil 18 shown in FIG. 5. FIG. 7 is a plan view showing a drive magnet piece 24 and the drive coil 18 which is viewed in the "H-H" direction in FIG. 6. FIG. 8 is an explanatory perspective view showing magnetized states of the drive magnet parts 17 which are disposed at four corners of the lens drive device 1 shown in FIG. 1. FIG. 9 is an explanatory plan view showing an arranging relationship between the drive coil 18 and the coil protection members 20 and 21 shown in FIG. 4.

The drive magnet part 17 includes two drive magnet pieces 23 and 24, which are formed in a substantially triangular prism shape and disposed to superpose on each other in the optical axis direction, and a magnetic plate 25 which is disposed between the drive magnet pieces 23 and 24. In this embodiment, the drive magnet piece 23 is disposed on the object side and the drive magnet piece 24 is disposed on the opposite-to-object side. An end face on the opposite-to-object side of the drive magnet piece 23 is fixed to an object side face of the magnetic plate 25 and an end face on the object side of the drive magnet piece 24 is fixed to an opposite-to-object side face of the magnetic plate 25.

The drive magnet pieces 23 and 24 are formed so that their shapes viewed in the optical axis direction are a substantially rectangular equilateral triangle. As shown in FIGS. 7 and 8, the drive magnet pieces 23 and 24 are provided with two rectangular flat parts 23a and 24a, which are substantially parallel to the optical axis "L" and perpendicular to each other, and rectangular slant face parts 23b and 24b which are substantially parallel to the optical axis "L" for connecting two flat parts 23a and 24a.

The drive magnet pieces 23 and 24 are disposed so that an inner peripheral face of the tube part 11b of the first case body 11 is substantially parallel to the flat parts 23a and 24a. In other words, two drive magnet pieces 23 and two drive magnet pieces 24 which are disposed at diagonal positions on the inner side of the first case body 11 are respectively disposed so that the slant face parts 23b and the slant face parts 24b are faced each other. Further, the drive magnet pieces 23 are fixed to the bottom part 11a of the first case body 11. Specifically, end faces on the object side of the drive magnet pieces 23 are fixed to the opposite-to-object side face of the bottom part 11a. The end faces on the object side of the drive magnet pieces 23 are abutted with the opposite-to-object side face of the bottom part 11a.

The magnetic plate 25 is formed of magnetic material. The magnetic plate 25 is formed in a flat plate shape so that its shape viewed in the optical axis direction is substantially rectangular equilateral triangle similarly to the drive magnet pieces 23 and 24.

An end face on the opposite-to-object side of the drive magnet piece 24 is fixed with a flat plate-shaped magnetic plate 26 which is formed of magnetic material. The magnetic plate 26 is formed so that its shape viewed in the optical axis direction is a substantially rectangular equilateral triangle. As shown in FIG. 8, the magnetic plate 26 is fixed to the drive magnet piece 24 so that its slant side part becomes substantially parallel to the slant face part 24b of the drive magnet piece 24. Further, the magnetic plate 26 is abutted with the inner peripheral face of the tube part 11b of the first case body 11.

The drive coil 18 is, as shown in FIG. 7, wound around so that its shape viewed in the optical axis direction is a substantially rectangular equilateral triangle. As shown in FIGS. 5 and 7, the drive coil 18 is provided with two perpendicular face parts 18a, which are formed in a rectangular shape, substantially parallel to the optical axis "L" and perpendicular to each other, and a rectangular slant face part 18b which is substantially parallel to the optical axis "L" and connects two perpendicular face parts 18a. In accordance with an embodiment of the present invention, four drive coils 18 are formed by means of that one conducting wire is wound around successively. One end part of the conducting wire is wound around and connected with the coil end fixing member 9 and the other end part of the conducting wire is wound around and connected with the coil end fixing member 10.

Four drive coils 18 are fixed to the outer peripheral face of the sleeve 8 in a state that the slant face parts 18b are placed on the second placing faces 8b of the sleeve 8. Specifically, four drive coils 18 are fixed to the outer peripheral face of the sleeve 8 with a substantially 90° pitch so that the inner peripheral face of the drive coil 18 and the outer peripheral face of the drive magnet part 17 are substantially parallel to each other through a predetermined gap space. The drive coils 18 are disposed at four corners on the inner side of the first case body 11. In this embodiment, the drive coils 18 are disposed at four corners on the inner side of the first case body 11 in a state that a predetermined gap space is maintained between the inner peripheral face of the first case body 11 and the drive coils 18. Therefore, the drive coils 18 are movable in the optical axis direction together with the sleeve 8. In other words, two perpendicular face parts 18a are disposed to be parallel to the inner peripheral face of the first case body 11, and two perpendicular face parts 18a are movable in the optical axis direction between the flat face parts 23a and 24a of the drive magnet pieces 23 and 24 and the inner peripheral face of the tube part 11*b* of the first case body 11.

A width in the optical axis direction of the drive coil 18 is set to be not less than the sum of a thickness of the magnetic plate 25 and a moving distance of the movable body 2. Further, in this embodiment, the drive magnet part 17 and the drive coil 18 are disposed so that the magnetic plate 25 is always disposed on the inner peripheral side of the drive coil 18 in the moving range of the movable body 2.

As shown in FIGS. 6 and 8, two drive magnet pieces 23 and 24 structuring the drive magnet part 17 are disposed so that the same magnetic poles ("S"-pole and "S"-pole, or "N"-pole and "N"-pole) are faced each other in the optical axis direction. In other words, opposite faces of the drive magnet pieces 23 and 24 are magnetized in the same magnetic pole respectively. Therefore, as shown in FIGS. 6 and 7, magnetic flux "F" passing through the perpendicular face parts 18*a* and the slant face part 18*b* of the drive coil 18 is generated between the drive magnet pieces 23 and 24. In other words, the drive magnet part 17 is magnetized so that the magnetic flux "F" passing through the drive coil 18 is generated at a position where the drive magnet part 17 faces the drive coil 18. Further, the center in the optical axis direction of the magnetic plate 25 is located at a magnetic center position of the drive magnet part 17 in the optical axis direction.

As shown in FIG. 8, the magnetic poles which are formed on opposite faces of two drive magnet pieces 23 and 24 structuring the drive magnet part 17 are different from the magnetic poles which are formed on opposite faces of two other drive magnet pieces 23 and 24 adjacent to each other in the circumferential direction of the lens drive device 1. For example, magnetic poles formed on the opposite faces of the drive magnet pieces 23 and 24 which are disposed on the right side and the left side in FIG. 8 are "S"-poles, and magnetic poles formed on the opposite faces of the drive magnet pieces 23 and 24 which are disposed on the upper side and the lower side in FIG. 6 are "N"-poles. Therefore, in the example shown in FIG. 8, the magnetic flux "F" is generated so as to go from spaces between the drive magnet pieces 23 and 24 disposed on the upper side and the lower side in FIG. 8 to spaces between the drive magnet pieces 23 and 24 disposed on the right side and the left side in FIG. 8.

In this embodiment, the magnetic poles which are formed on opposite faces of two drive magnet pieces 23 and 24 are different from the magnetic poles which are formed on opposite faces of other two drive magnet pieces 23 and 24 adjacent to each other in the circumferential direction. Therefore, winding directions of the drive coils 18 which are disposed around the drive magnet pieces 23 and 24 disposed on the upper side and the lower side in FIG. 8 are different from winding directions of the drive coils 18 which are disposed around the drive magnet pieces 23 and 24 disposed on the right side and the left side in FIG. 8.

The magnetic member 19 which is formed of magnetic material is, as shown in FIG. 4, formed in a substantially ring shape. The magnetic member 19 is fixed to the end faces on the object side of the slant face parts 18*b* and are disposed on an inner side in the radial direction with respect to the drive magnet parts 17 of the lens drive device 1. In this embodiment, a distance in the optical axis direction between the first placing face 8*a* and the second placing face 8*b* is set to be substantially equal to a width in the optical axis direction of the drive coil 18. Further, the magnetic member 19 is fixed to the end face on the object side of the drive coil 18 in the state that the magnetic member 19 is placed on the first placing face 8*a*.

As described above, in this embodiment, the drive magnet part 17 and the drive coil 18 are disposed so that the magnetic plate 25 is always disposed on the inner peripheral side of the drive coil 18 in the moving range of the movable body 2. In other words, the magnetic member 19 is disposed so that an outer end in the radial direction of the magnetic member 19 faces the slant face part 23*b* of the drive magnet piece 23 in the moving range of the movable body 2.

Further, in this embodiment, the drive magnet part 17 and the drive coil 18 are disposed so that the magnetic member 19 is attracted toward the magnetic center position of the drive magnet part 17 in the moving range of the movable body 2. Therefore, when an electric current is not supplied to the drive coils 18, as shown in FIG. 2, the end face on the opposite-to-object side of the sleeve 8 is abutted with the abutting face 12*a* of the second case body 12 by an attraction force generated between the magnetic member 19 and the drive magnet parts 17.

In this embodiment, the flat spring 5 is fixed to the movable body 2 and the fixed body 3 so that an urging force toward the opposite-to-object side is generated in the movable body 2 when an electric current is not supplied to the drive coils 18. Further, the flat spring 6 is fixed to the movable body 2 and the fixed body 3 so that an urging force in the optical axis direction by the flat spring 6 is not generated in the movable body 2 when the end face on the opposite-to-object side of the sleeve 8 is abutted with the abutting face 12*a* of the second case body 12.

The coil protection members 20 and 21 are formed of relatively hard resin material such as PET (polyethylene terephthalate) and, as shown in FIG. 4, are formed in a substantially rectangular frame shape so as to superpose on the respective perpendicular face parts 18*a* of four drive coils 18. Further, the coil protection members 20 and 21 are formed in a flat plate shape. In this embodiment, the coil protection member 20 is attached to the end face on the object side of the drive coil 18 and the coil protection member 21 is attached to the end face on the opposite-to-object side of the drive coil 18. Specifically, the coil protection member 20 is fixed to the end faces on the object side of the perpendicular face parts 18*a* of four drive coils 18, and the coil protection member 21 is fixed to the end faces on the opposite-to-object side of the perpendicular face parts 18*a* of four drive coils 18.

As shown in FIG. 9, when viewed in the optical axis direction, outer side end parts 20*a* and 21*a* in the "X" direction of the coil protection members 20 and 21 are protruded toward the outer peripheral side (outer side in the "X" direction) from the outer peripheral face of the perpendicular face part 18*a* which is perpendicular to the "X" direction. In other words, when viewed in the optical axis direction, the outer side end parts 20*a* and 21*a* in the "X" direction are protruded toward the outer side in the "X" direction from the outer end in the "X" direction of the perpendicular face part 18*a* which is perpendicular to the "X" direction.

Further, when viewed in the optical axis direction, outer side end parts 20*b* and 21*b* in the "Y" direction of the coil protection members 20 and 21 are protruded toward the outer peripheral side (outer side in the "Y" direction) from the outer peripheral face of the perpendicular face part 18*a* which is perpendicular to the "Y" direction. In other words, when viewed in the optical axis direction, the outer side end parts 20*b* and 21*b* in the "Y" direction are protruded toward the outer side in the "Y" direction from the outer end in the "Y" direction of the perpendicular face part 18*a* which is perpendicular to the "Y" direction.

In addition, when viewed in the optical axis direction, inner side end parts 20*c* and 21*c* in the "X" direction of the coil protection members 20 and 21 are protruded toward the inner peripheral side (inner side in the "X" direction) from the inner peripheral face of the perpendicular face part 18a which is perpendicular to the "X" direction. Further, inner side end parts 20d and 21d in the "Y" direction of the coil protection members 20 and 21 are protruded toward the inner peripheral side (inner side in the "Y" direction) from the inner peripheral face of the perpendicular face part 18a which is perpendicular to the "Y" direction.

As described above, in this embodiment, the coil protection member 20 is fixed to the end face on the object side of the perpendicular face part 18a so as to substantially cover the end face on the object side of the perpendicular face part 18a, and the coil protection member 21 is fixed to the end face on the opposite-to-object side of the perpendicular face part 18a so as to substantially cover the end face on the opposite-to-object side of the perpendicular face part 18a.

In this embodiment, the outer side end parts 20a and 21a in the "X" direction are first coil protection end parts and the outer side end parts 20b and 21b in the "Y" direction are second coil protection end parts. Further, the inner side end parts 20c and 21c in the "X" direction and the inner side end parts 20d and 21d in the "Y" direction are inner peripheral side coil protection end parts.

As described above, in this embodiment, the substantially triangular prism-shaped drive magnet parts 17 and the substantially triangular tube-shaped drive coils 18 are disposed at four corners of the lens drive device 1 whose shape viewed in the optical axis direction is substantially square shape. Therefore, the drive magnet parts 17 and the drive coils 18 are disposed at four corners of the lens drive device 1 which are likely to be dead spaces of the lens drive device 1 for driving a lens whose shape viewed in the optical axis direction is substantially circular.

Further, in this embodiment, the inner peripheral face of the drive coil 18 which is wound around in a substantially triangular tube shape is oppositely disposed to the outer peripheral face of the drive magnet part 17 through a predetermined gap space, and the drive magnet part 17 is magnetized so that magnetic flux "F" passing through the drive coil 18 is generated at a position facing the drive coil 18. Therefore, a magnetic circuit for driving the movable body 2 is efficiently formed by utilizing the entire periphery of the drive magnet part 17 and by utilizing the entire periphery of the drive coil 18. Accordingly, even when the sizes of the drive magnet part 17 and the drive coil 18 are reduced, a required drive force for driving the movable body 2 can be obtained. In other words, while securing a drive force for driving the movable body 2, the sizes of the drive magnet part 17 and the drive coil 18 can be reduced.

As described above, in this embodiment, the sizes of the drive magnet part 17 and the drive coil 18 can be reduced, and the drive magnet parts 17 and the drive coils 18 can be disposed at four corners, which are likely to be dead spaces, of the lens drive device 1. Therefore, in this embodiment, even when a diameter of a mounted lens is increased, the size of the lens drive device 1 can be reduced.

In this embodiment, when viewed in the optical axis direction, outer side end parts 20a and 21a in the "X" direction of the coil protection members 20 and 21 are protruded toward the outer side from the outer peripheral face of the perpendicular face part 18a which is perpendicular to the "X" direction, and outer side end parts 20b and 21b in the "Y" direction of the coil protection members 20 and 21 are protruded toward the outer side from the outer peripheral face of the perpendicular face part 18a which is perpendicular to the "Y" direction. Therefore, for example, due to an impact which is applied to the lens drive device 1, when the movable body 2 is relatively displaced in the "X" direction or the "Y" direction with respect to the fixed body 3, when the movable body 2 is relatively turned around the axial direction with respect to the fixed body 3, when the optical axis of the movable body 2 is inclined, or the like, the coil protection members 20 and 21 are abutted with the inner peripheral face of the tube part 11b of the first case body 11 which is disposed to surround the drive mechanism 4 and the drive coils 18 are not abutted with the inner peripheral face of the tube part 11b of the first case body 11. Accordingly, even when an impact is applied to the lens drive device 1, the drive coils 18 are protected and thus disconnection or deformation of the drive coils 18 are prevented.

Especially, in this embodiment, when viewed in the optical axis direction, the inner side end parts 20c and 21c in the "X" direction of the coil protection members 20 and 21 are protruded toward the inner side in the "X" direction from the inner peripheral face of the perpendicular face part 18a which is perpendicular to the "X" direction, and the inner side end parts 20d and 21d in the "Y" direction of the coil protection members 20 and 21 are protruded toward the inner side in the "Y" direction from the inner peripheral face of the perpendicular face part 18a which is perpendicular to the "Y" direction. Therefore, when an impact is applied to the lens drive device 1, the drive magnet parts 17 and the drive coils 18 are prevented from being contacted with each other.

Further, in this embodiment, the coil protection members 20 and 21 are attached to the object side and the opposite-to-object side of the drive coil 18. Therefore, even in a case that protruding amounts in the "X" direction of the coil protection members 20 and 21 with respect to the drive coil 18 and protruding amounts in the "Y" direction of the coil protection members 20 and 21 with respect to the drive coil 18 are small, when the optical axis of the movable body 2 is inclined, contact of the first case body 11 with the drive coil 18 and contact of the drive magnet part 17 with the drive coil 18 are prevented surely.

In this embodiment, the coil protection members 20 and 21 which are formed in a substantially rectangular frame shape are fixed to the object sides and the opposite-to-object sides of the drive coils 18. Therefore, at the time of assembling of the lens drive device 1, a coil part assembly can be structured by using four drive coils 18 and the coil protection members 20 and 21. Accordingly, at the time of assembling of the lens drive device 1, four drive coils 18 can be handled easily.

In this embodiment, the coil protection member 20 is attached to the end face on the object side of the drive coil 18 and the coil protection member 21 is attached to the end face on the opposite-to-object side of the drive coil 18. Therefore, another structure for mounting the coil protection members 20 and 21 is not required and thus the structure of the lens drive device 1 can be simplified.

In this embodiment, the coil protection members 20 and 21 are formed in a substantially rectangular frame shape. Therefore, even when the drive coils 18 are disposed at four corners of the lens drive device 1, four drive coils 18 are protected by the coil protection member 20 and the coil protection member 21. Therefore, the structure and assembling processes of the lens drive device 1 can be simplified.

Although the present invention has been shown and described with reference to a specific embodiment, various changes and modifications will be apparent to those skilled in the art from the teachings herein.

In the embodiment described above, the magnetic plate 25 is disposed between the drive magnet pieces 23 and 24. However, a gap space may be formed between the opposite faces of the drive magnet pieces 23 and 24, or the opposite faces of the drive magnet pieces 23 and 24 may be abutted with each other. Further, in the embodiment described above, the drive magnet part 17 is structured of two drive magnet pieces 23 and 24 and the magnetic plate 25. However, the drive magnet part 17 may be structured of one drive magnet piece. In this case, the drive magnet piece is magnetized so that magnetic poles formed at both ends in the optical axis direction are different from the magnetic pole formed at an intermediate position in the optical axis direction. In other words, the drive magnet piece is magnetized so that the magnetic flux "F" passing through the drive coil 18 is generated at a position facing the drive coil 18.

Figure 10A:
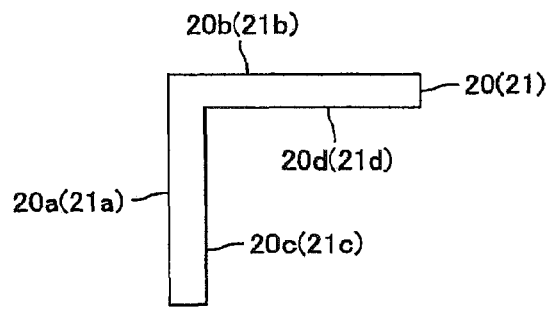
FIGS. 10(A) through 10(D) are plan views showing coil protection members in accordance with other embodiments of the present invention.

In the embodiment described above, the coil protection members 20 and 21 are formed in a substantially rectangular frame shape. However, the present invention is not limited to this embodiment. For example, as shown in FIG. 10(A), the coil protection members 20 and 21 may be formed in a substantially "L"-shape. In this case, for example, coil protection members 20 and 21 having a substantially "L"-shape are fixed to all of the end faces on the object side and the end faces on the opposite-to-object side of the perpendicular face parts 18a of the drive coils 18 which are disposed at the four corners. In other words, in this case, the drive mechanism 4 is provided with four coil protection members 20 and four coil protection members 21. Further, the coil protection members 20 and 21 having a substantially "L"-shape may not be fixed to all of the drive coils 18 disposed at the four corners when the drive coils 18 disposed at the four corners are protected. For example, the coil protection members 20 and 21 having a substantially "L"-shape may be fixed to end faces on the object side and end faces on the opposite-to-object side of the perpendicular face parts 18a of two drive coils 18 which are disposed at diagonal positions across the optical axis "L".

Figure 10B:
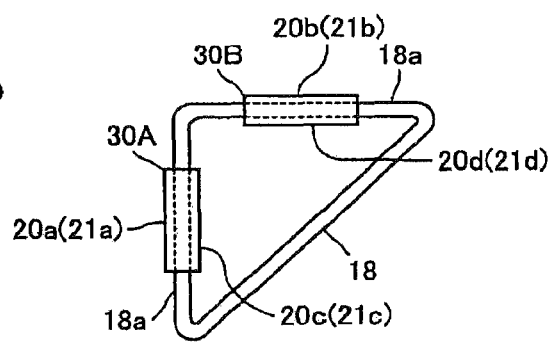

Further, the coil protection members 20 and 21 may be, as shown in FIG. 10(B), structured of a pair of protection member pieces 30A and 30 B which cover parts of the end faces on the object side and parts of the end faces on the opposite-to-object side of the perpendicular face parts 18a. In this case, for example, when viewed in the optical axis direction, outer side end parts 20a and 21a in the "X" direction of the coil protection member 30A are protruded toward the outer side from the outer peripheral face of the perpendicular face part 18a which is perpendicular to the "X" direction, and outer side end parts 20b and 21b in the "Y" direction of the coil protection members 30B are protruded toward the outer side from the outer peripheral face of the perpendicular face part 18a which is perpendicular to the "Y" direction. Further, in this case, for example, a pair of the protection member pieces 30A and 30 B are fixed to all of end faces on the object side and end faces on the opposite-to-object side of the perpendicular face parts 18a of the drive coils 18 which are disposed at the four corners. In accordance with an embodiment of the present invention, the protection member pieces 30A and 30 B may be formed in a polygonal shape such as a rectangular shape as shown in FIG. 10(B) and may be a circular shape or an elliptical shape.

Figure 10C:
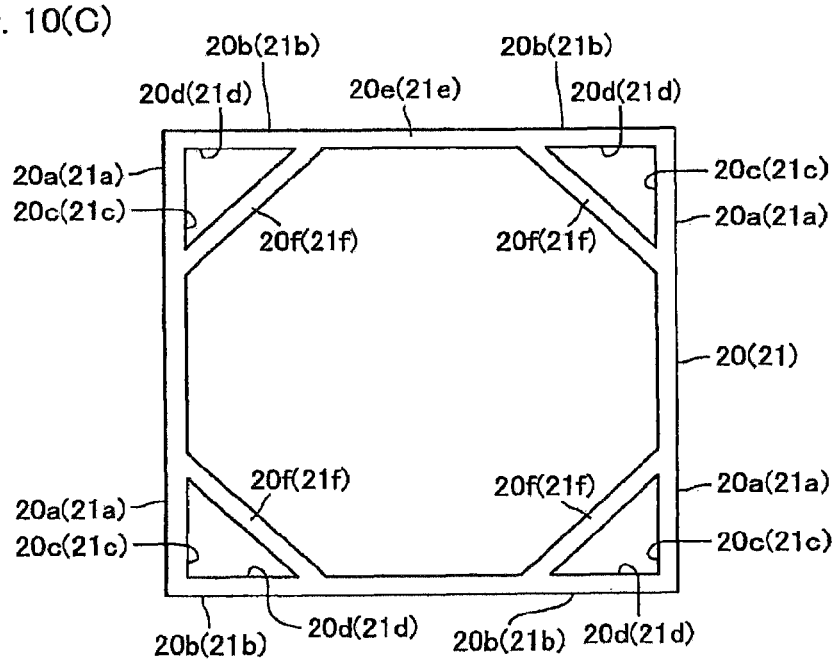

In the embodiment described above, the coil protection members 20 and 21 are formed in a substantially rectangular frame shape which cover the end face on the object side and the end face on the opposite-to-object side of the perpendicular face part 18a. However, the present invention is not limited to this embodiment. For example, as shown in FIG. 10(C), the coil protection members 20 and 21 may be structured of frame parts 20e and 21e, which are formed in a substantially rectangular frame shape and which cover the end faces on the object side and the end faces on the opposite-to-object side of the perpendicular face parts 18a, and slant side parts 20f and 21f which are formed at four corners of the frame parts 20e and 21e and which cover the end face on the object side and the end face on the opposite-to-object side of the slant face parts 18b. In this case, even when the movable body 2 is relatively displaced in the optical axis direction excessively with respect to the fixed body 3 due to an impact applied to the lens drive device 1, the drive coils 18 are surely protected by the coil protection members 20 and 21. For example, contact of the slant face parts 18b of the drive coils 18 with the flat spring 5 are prevented surely.

Figure 10D:
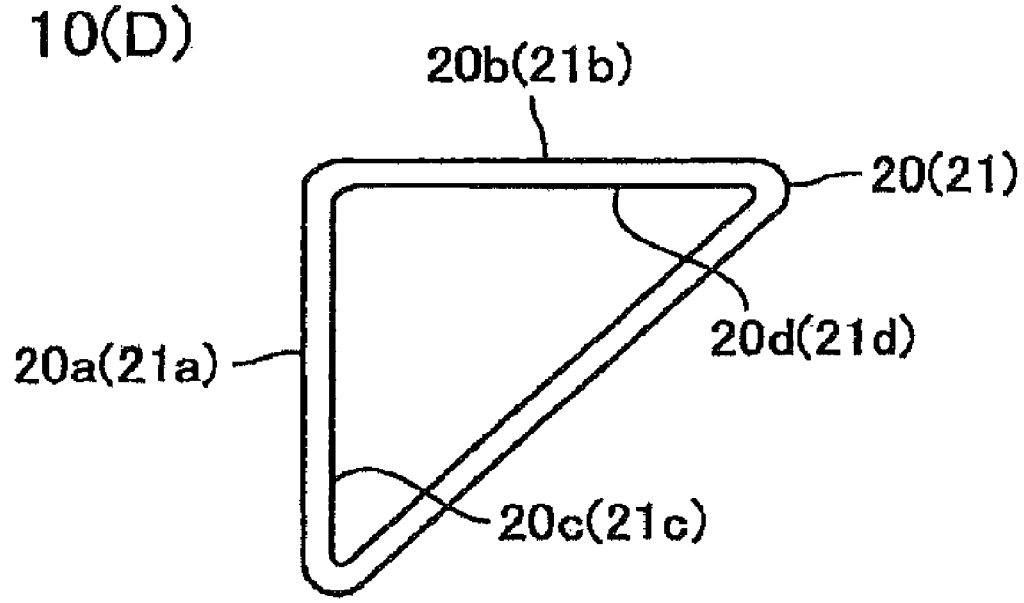

Further, as shown in FIG. 10(D), the coil protection members 20 and 21 may be formed in a frame shape having a substantially rectangular equilateral triangular. In this case, for example, the coil protection members 20 and 21 are fixed to all of the end faces on the object side and the end faces on the opposite-to-object side of the drive coils 18 which are disposed at four corners. In comparison with a case that the coil protection members 20 and 21 are formed as shown in FIG. 10(D), when the coil protection members 20 and 21 are formed as shown in FIG. 10(C), the coil protection members 20 and 21 can be handled easily.

In the embodiment described above, the coil protection members 20 and 21 are attached to the end faces on the object side and the end faces on the opposite-to-object side of the drive coils 18. However, the present invention is not limited to this embodiment. For example, in a case that a protruding amount in the "X" direction of the coil protection member 20 or 21 from the drive coil 18 is set to be larger, and a protruding amount in the "Y" direction of the coil protection member 20 or 21 from the drive coil 18 is set to be larger, the coil protection members 20 and 21 may be attached to only one of the end face on the object side or the end face on the opposite-to-object side of the drive coil 18.

In the embodiment described above, when viewed in the optical axis direction, the outer side end parts 20a and 21a in the "X" direction of the coil protection members 20 and 21 are protruded toward the outer side in the "X" direction from the outer peripheral face of the perpendicular face part 18a which is perpendicular to the "X" direction, and the outer side end parts 20b and 21b in the "Y" direction of the coil protection members 20 and 21 are protruded toward the outer side in the "Y" direction from the outer peripheral face of the perpendicular face part 18a which is perpendicular to the "Y" direction. However, the present invention is not limited to this embodiment. For example, in order to protect the drive coils 18, the coil protection members 20 and 21 may be formed so that, when viewed in the optical axis direction, the outer side end parts 20a and 21a in the "X" direction of the coil protection members 20 and 21 are superposed on the outer peripheral end face of the perpendicular face part 18a which is perpendicular to the "X" direction, (in other words, edge faces of the outer side end parts 20a and 21a are coincided with the outer edge face of the perpendicular face part 18a), and the outer side end parts 20b and 21b in the "Y" direction of the coil protection members 20 and 21 are superposed on the outer peripheral end face of the perpendicular face part 18a which is perpendicular to the "Y" direction (in other words, edge faces of the outer side end parts 20b and 21b are coincided with the outer edge face of the perpendicular face part 18a).

In the embodiment described above, when viewed in the optical axis direction, the inner side end parts 20c and 21c in the "X" direction of the coil protection members 20 and 21 are protruded toward the inner side in the "X" direction from the inner peripheral face of the perpendicular face part 18a which is perpendicular to the "X" direction, and the inner side end parts 20d and 21d in the "Y" direction of the coil protection members 20 and 21 are protruded toward the inner side in the "Y" direction from the inner peripheral face of the perpendicular face part 18a which is perpendicular to the "Y" direction. However, the present invention is not limited to this embodiment. For example, a gap space (distance) may be set between the drive magnet part 17 and the drive coil 18 so that, when the movable body 2 is relatively displaced in the "X" direction or the "Y" direction with respect to the fixed body 3 due to an impact applied to the lens drive device 1, the outer side end parts 20a and 21a in the "X" direction and the outer side end parts 20b and 21b in the "Y" direction are abutted with the inner peripheral face of the tube part 11b of the first case body 11 but the drive coil 18 is not abutted with the drive magnet part 17. In this case, the inner side end parts 20c and 21c in the "X" direction are not required to protrude toward the inner side in the "X" direction from the inner peripheral face of the perpendicular face part 18a which is perpendicular to the "X" direction and the inner side end parts 20d and 21d in the "Y" direction are not required to protrude toward the inner side in the "Y" direction from the inner peripheral face of the perpendicular face part 18a which is perpendicular to the "Y" direction.

In the embodiment described above, the coil protection members 20 and 21 are formed of resin material but the coil protection members 20 and 21 may be formed of metal material. In this case, the coil protection member 20 which is fixed to the end face on the object side of the drive coil 18 may be formed of magnetic material. When the coil protection member 20 is formed of magnetic material, the coil protection member 20 can be provided with the function of the magnetic member 19. Therefore, in this case, the magnetic member 19 is not required to be separately provided and thus the structure of the lens drive device 1 can be simplified.

In the embodiment described above, the coil protection members 20 and 21 are fixed to the end face on the object side and the end face on the opposite-to-object side of the drive coil 18. However, the present invention is not limited to this embodiment. For example, fixing parts for the coil protection members 20 and 21 may be formed in the sleeve 8 and the coil protection members 20 and 21 are fixed to the fixing parts.

In the embodiment described above, the drive magnet part 17 and the drive coil 18 are disposed at four corners of the lens drive device 1. However, the present invention is not limited to this embodiment. For example, when a sufficient drive force for the movable body 2 can be obtained, the drive magnet part 17 and the drive coil 18 may be disposed at three or less, only one of four corners of the lens drive device 1.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens drive device whose shape is substantially rectangular when viewed in an optical axis direction of a lens, the lens drive device comprising:

a movable body which holds the lens and which is movable in the optical axis direction;

a fixed body which movably holds the movable body; and a drive mechanism for driving the movable body in the optical axis direction;

wherein the drive mechanism comprising:

a drive magnet part which is formed in a substantially triangular prism shape and which is disposed at least in one of four corners of the lens drive device;

a drive, coil which is wound around in a substantially triangular tube shape and which is attached to the movable body so that its inner peripheral face is oppositely disposed to an outer peripheral face of the drive magnet part through a gap space; and a coil protection member which is attached to at least one of an object to be photographed or imaged side and an opposite-to-object side of the drive coil;

wherein the drive magnet part is magnetized so that a magnetic flux passing through the drive coil is generated at an opposite position to the drive coil; and wherein, when two directions which are perpendicular to each other and which are substantially parallel to side faces of the lens drive device are set to be a first direction and a second direction, the coil protection member comprises, when viewed in the optical axis direction, a first coil protection end part, which is superposed on an outer side end of the drive coil in the first direction or which is protruded toward an outer side in the first direction from the outer side end of the drive coil in the first direction, and a second coil protection end part which is superposed on an outer side end of the drive coil in the second direction or which is protruded toward an outer side in the second direction from the outer side end of the drive coil in the second direction.

2. The lens drive device according to claim 1, wherein the drive coil is wound around so that its shape when viewed in the optical axis direction is a substantially rectangular equilateral triangle, and the drive coil is provided with two perpendicular face parts, which are substantially parallel to an optical axis of the lens and perpendicular to each other, and a slant face part which is substantially parallel to the optical axis of the lens and which connects the two perpendicular face parts with each other, and the drive coil is attached to the movable body so that the perpendicular face parts are substantially parallel to the side faces of the lens drive device, and the first coil protection end part and the second coil protection end part are protruded toward outer peripheral sides from outer peripheral faces of the two perpendicular face parts when viewed in the optical axis direction.

3. The lens drive device according to claim 2, wherein the coil protection member is formed with inner peripheral side coil protection end parts which are protruded toward inner peripheral sides from inner peripheral faces of the two perpendicular face parts when viewed in the optical axis direction.

4. The lens drive device according to claim 3, wherein the coil protection member is attached to at least one of an end face on the object to be photographed or imaged side and an end face on the opposite-to-object side of the drive coil.

5. The lens drive device according to claim 4, further comprising a case body which is formed of magnetic material in a substantially rectangular tube shape and which is disposed so as to surround the movable body and the drive mechanism.

6. The lens drive device according to claim 4, wherein the movable body comprises:
- a lens holder which is provided with a small diameter part on which a small diameter lens is mounted and a large diameter part on which a large diameter lens is mounted; and
- a sleeve which holds the lens holder on its inner peripheral side and which is formed with a placing face on which the drive coil is placed at a boundary portion between the small diameter part and the large diameter part of the lens holder; and
- the drive coil is fixed to an outer peripheral face of the sleeve which corresponds to the small diameter part of the lens holder.

7. The lens drive device according to claim 2, wherein the coil protection member covers at lest one of an end face on the object to be photographed or imaged side and an end face on the opposite-to-object side of the perpendicular face part and the slant face part.

8. The lens drive device according to claim 7, further comprising a case body which is formed of magnetic material in a substantially rectangular tube shape and which is disposed so as to surround the movable body and the drive mechanism,
wherein the two perpendicular face parts of the drive coil is disposed at each of four corners of the case body, and
wherein the coil protection member comprises:
- a frame part which is formed in a substantially rectangular frame shape; and
- slant side parts which are formed at each of four corners of the frame part so as to cover the slant face parts.

9. The lens drive device according to claim 1, wherein the coil protection member is attached to at least one of an end face on the object to be photographed or imaged side and an end face on the opposite-to-object side of the drive coil.

10. The lens drive device according to claim 9, further comprising a case body which is formed of magnetic material in a substantially rectangular tube shape and which is disposed so as to surround the movable body and the drive mechanism.

11. The lens drive device according to claim 1, further comprising a case body which is formed of magnetic material in a substantially rectangular tube shape and which is disposed so as to surround the movable body and the drive mechanism.

12. The lens drive device according to claim 11, wherein the drive coil is wound around so as to form a substantially rectangular equilateral triangle which is provided with two perpendicular face parts perpendicular to each other and a slant face part connecting the two perpendicular face parts, and
the two perpendicular face parts are disposed to be parallel to an inner peripheral face of the case body, and the two perpendicular face parts are prevented from contacting with the inner peripheral face of the case body by the first coil protection end part and the second coil protection end part.

13. The lens drive device according to claim 12, wherein the movable body comprises:
- a lens holder which is provided with a small diameter part on which a small diameter lens is mounted and a large diameter part on which a large diameter lens is mounted; and
- a sleeve which holds the lens holder on its inner peripheral side and which is formed with a placing face on which the drive coil is placed at a boundary portion between the small diameter part and the large diameter part of the lens holder; and
- the drive coil is fixed to an outer peripheral face of the sleeve which corresponds to the small diameter part of the lens holder.

14. The lens drive device according to claim 13, wherein the drive magnet part is disposed at each of four corners of the lens drive device, and
the coil protection member is formed in a substantially rectangular frame shape so as to superpose on the two perpendicular face parts of the drive coil which are perpendicular to each other.

15. The lens drive device according to claim 14, wherein the coil protection member is provided with a frame part which is formed in a substantially rectangular frame shape and slant side parts which are formed at each of four corners of the frame part so as to cover the slant face parts.

16. The lens drive device according to claim 12, wherein the coil protection member is formed with inner peripheral side coil protection end parts which are protruded toward inner peripheral sides from inner peripheral faces of the two perpendicular face parts when viewed in the optical axis direction.

17. The lens drive device according to claim 1, wherein the coil protection member is attached to an end face on the object to be photographed or imaged side and an end face on the opposite-to-object side of the drive coil.

18. The lens drive device according to claim 17, wherein the drive magnet part is disposed at each of four corners of the lens drive device, and the coil protection member is formed in a substantially rectangular frame shape.

* * * * *